Feb. 8, 1955    I. J. FINK    2,701,505
MILLING DEVICE
Original Filed April 29, 1949    5 Sheets-Sheet 1

INVENTOR.
Israel J. Fink
BY
Murray, Sachnoff & Murray
ATT'YS

Feb. 8, 1955  I. J. FINK  2,701,505
MILLING DEVICE

Original Filed April 29, 1949  5 Sheets-Sheet 2

Fig. 2

INVENTOR.
Israel J. Fink
BY
Murray, Sackhoff & Murray
ATT'YS

Fig. 3

Feb. 8, 1955     I. J. FINK     2,701,505
MILLING DEVICE Original Filed April 29, 1949     5 Sheets-Sheet 4

INVENTOR.
Israel J. Fink
BY
ATT'YS

Feb. 8, 1955  I. J. FINK  2,701,505
MILLING DEVICE

Original Filed April 29, 1949  5 Sheets-Sheet 5

INVENTOR.
Israel J. Fink
BY
Murray, Sackhoff & Murray
ATT'YS

# United States Patent Office 2,701,505
Patented Feb. 8, 1955

2,701,505

MILLING DEVICE

Israel J. Fink, Cincinnati, Ohio

Continuation of abandoned application Serial No. 90,328, April 29, 1949. This application March 9, 1951, Serial No. 214,811

24 Claims. (Cl. 90—15.1)

The present invention relates to metal forming devices and is particularly directed to an automatic machine for intermittently producing an entire series of forming operations on different work pieces, said machine including a means operative periodically to progressively advance and index each work piece through the said series of operations. This application is a continuation of my co-pending application Serial No. 90,328 filed April 29, 1949, now abandoned.

It is an object of this invention to provide an improved machine which will effect a complete series of milling operations on small work pieces such as dental drills, dental burrs, or the like, which have a number of teeth milled in one of their ends and tool mounting slots formed in their opposed ends.

Another important object of this invention is to provide at least two juxtaposed, intermittently rotated turrets, each having a plurality of stations for carrying out an entire series of milling operations on different ends of a work piece with a periodically operative transfer device for successively moving finished work pieces from their stations on one turret to a station of an adjacent turret.

A further object of the invention is to provide an oscillating drive means for a turret type milling machine that progressively advances the turret during one phase of its movement and being adapted in the opposite phase of its movement to effect an entire series of milling operations on different work pieces.

A still further object of the invention is to provide in a machine tool having the foregoing characteristics, a means whereby the mechanism may be readily adjusted and/or modified to produce a plurality of simultaneously effected forming operations on a number of different work pieces advanced therethrough whereby a flexible machine is provided that is capable of efficiently manufacturing a variety of small metal articles in quantity.

Another object of the invention is to provide in a milling machine a turret that carries a plurality of intermittently rotatable milling stations each having a work clamp that is indexed by rotation around its axis during turret rotation, each of said stations also having tool spindle carriages that are actuated by a novel means during turret dwell periods to provide a compound feed and return stroke for the tools.

To the foregoing ends, generally stated, my invention consists of the novel devices and combination of devices hereinafter described, illustrated in the drawings, and defined in the appended claims.

The annexed drawings set forth in detail the preferred embodiment of my invention, like characters indicating like parts throughout the several views, wherein.

This invention is particularly useful in milling dental drills and is, for the purposes of exemplification illustrated in the drawings in connection with the removal of metal from small cylindrical pieces of stock to provide a dental drill having a tool mounting slot at one end portion and with a cutter head at the opposed end portion that has spaced, longitudinal extending grooves which join radially extending, inclined grooves formed in the extreme end of the head. It will be apparent, however, as the description proceeds, that the invention is applicable to the machining of other external surfaces which are square, conical or of other irregular contours. Therefore it is not my intention to limit the invention by the present disclosure but I aim to cover all modifications and alternate constructions falling within the spirit and scope of the invention as expressed in the appended claims.

Generally stated my invention comprises a machine base 15 which has mounted thereon a stock feeding and cutoff device X positioned on one side thereof and a vertically disposed frame member 16 mounted on its opposite side for rotatably mounting on parallel axes at least two turrets Y and Z, each carrying a number of work holding devices and associated milling mechanisms. The milling mechanisms are intermittently and simultaneously operated to carry out milling operations on different pieces while said turrets are inoperative, a work transfer device being also periodically operative to move the work from one turret to another during the turret dwell periods.

Specifically the machine base 15 has mounted thereon a gear box 17 that has journaled therein a hollow shaft 18 through one end of which bar stock 19 is fed. Fixed to the shaft is a pulley 20 driven by means of a suitable belt (not shown). A longitudinal drive shaft 21 is mounted on the rear wall 22 of the machine base by two journal bearings 23 and 24 and has a drive connection with the shaft 18 through reduction gearing housed in the box and generally indicated in Fig. 1 by the reference numeral 25.

A uni-directional operating clamp 26 for intermittently feeding the bar stock 19 through the shaft is slidably mounted on the shaft and is adapted when actuated to grip and feed forward the bar stock so that its end is inserted into one of a plurality of work holders 27 extending radially from the hub 28 of the turret Y. The clamp 26 is reciprocated for feed and return movements on the shaft 21 by means of an indexing disc 29 secured to the shaft and having an adjustable dog 30 thereon which periodically engages and rocks an arm 31 on its pivot 32, said arm having a yoke 33 extending beyond the pivot and engaged in a peripheral groove 34 formed in the clamp 26. A cutoff knife 35 is mounted on a cross slide 36 in turn mounted on a block 37 fixed to the machine base. The cross slide is intermittently fed toward the work and returned by means of an arm 38 depending from the cross slide and engaging an adjustable dog 39 carried by an indexing cam 40 fixed to the drive shaft 21.

The turret Y has its hub portion keyed to a horizontally disposed stub shaft 41 which is provided with an enlarged, integral portion 42 formed on its inner end and engaged in a journal bearing block 43 fixed to the frame member 16 by bolts 44. The enlarged bearing portion 42 has a series of six equispaced holes 45 formed in its periphery which correspond to the number and positions of the work holders 27 mounted on the hub 28. A spring urged ball detent 46 is disposed in a bore formed in the bearing block 43 and cooperates with the holes for determining the dwell positions of the turret which also regulates the work receiving and work discharge positions of the work holders carried by the turret.

Figure 3:
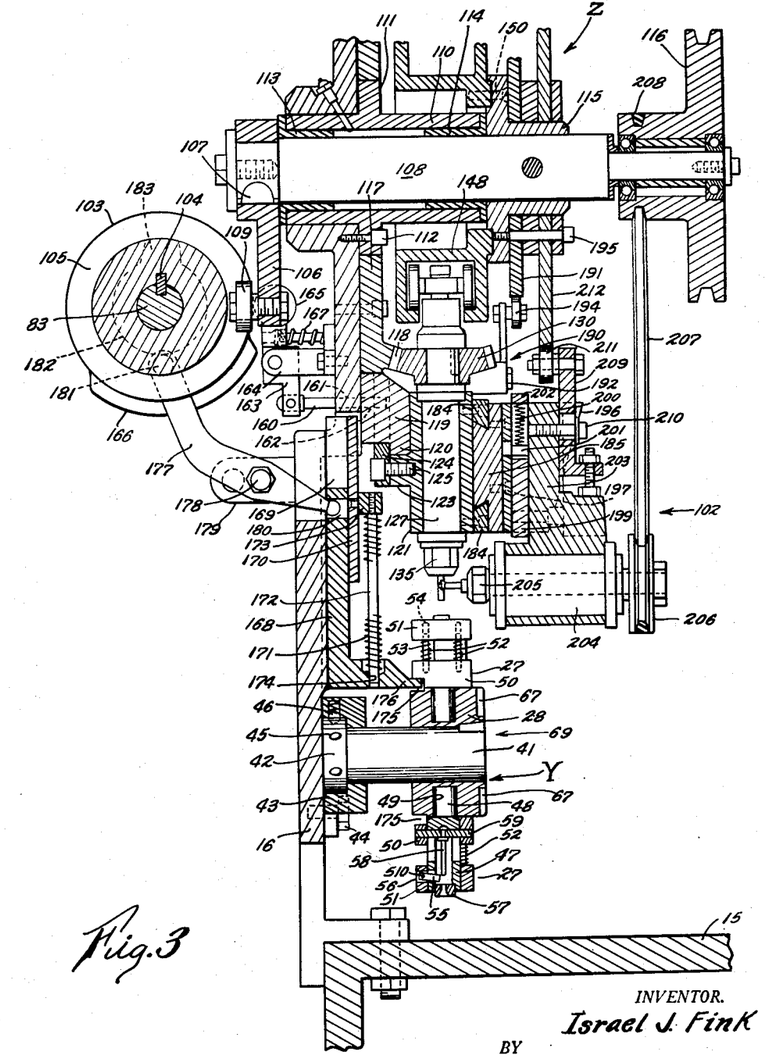
Fig. 3 is an enlarged section taken on line 3—3 of Fig. 2.

As clearly illustrated in Fig. 3 each of the six work holders 27 has a centrally disposed tubular body member 47 which has formed on its inner end a mounting lug 48 that may have a drive fit with its respective bore 49 formed in the turret hub 28. A pair of sleeves 50 and 51 are loosely fitted for sliding movement on the member 47 and are urged away from each other by means of springs 52 which are positioned therebetween around individual pins 53 fixed at one of their ends in the ring member 50 and having their free ends slidably received in aligned bores 54 formed in the ring member 51. The ring member 51 is secured on the member 47 for limited axial movement by a finger 55 pivoted in a slot 56 therein and having its end corner portions extendable into the path of a work piece which is inserted into the holder through a work holding disc 57 fixed in the outer end of the member. Work in the holder is clamped therein by cooperation of the disc 57 and the finger 55 in that the disc precludes lateral movement of the work whilst a corner of the finger is lightly pressed against the work by action of the springs 52 against the sleeve 51 which urges said sleeve outwardly and in turn sets up a pivotal action of the finger 55 by reason of its engagement with slot 510 in the body member 47 and the pivotal connection with the sleeve 51. The work is discharged from the holder into a work holder on turret Z by axial movement of a plunger 58 fixed to a cross rod 59 that is anchored in sleeve 50. This sleeve is slid outwardly on the body member 47 by a periodically actuated work transfer device to be described hereinafter.

Figure 2:
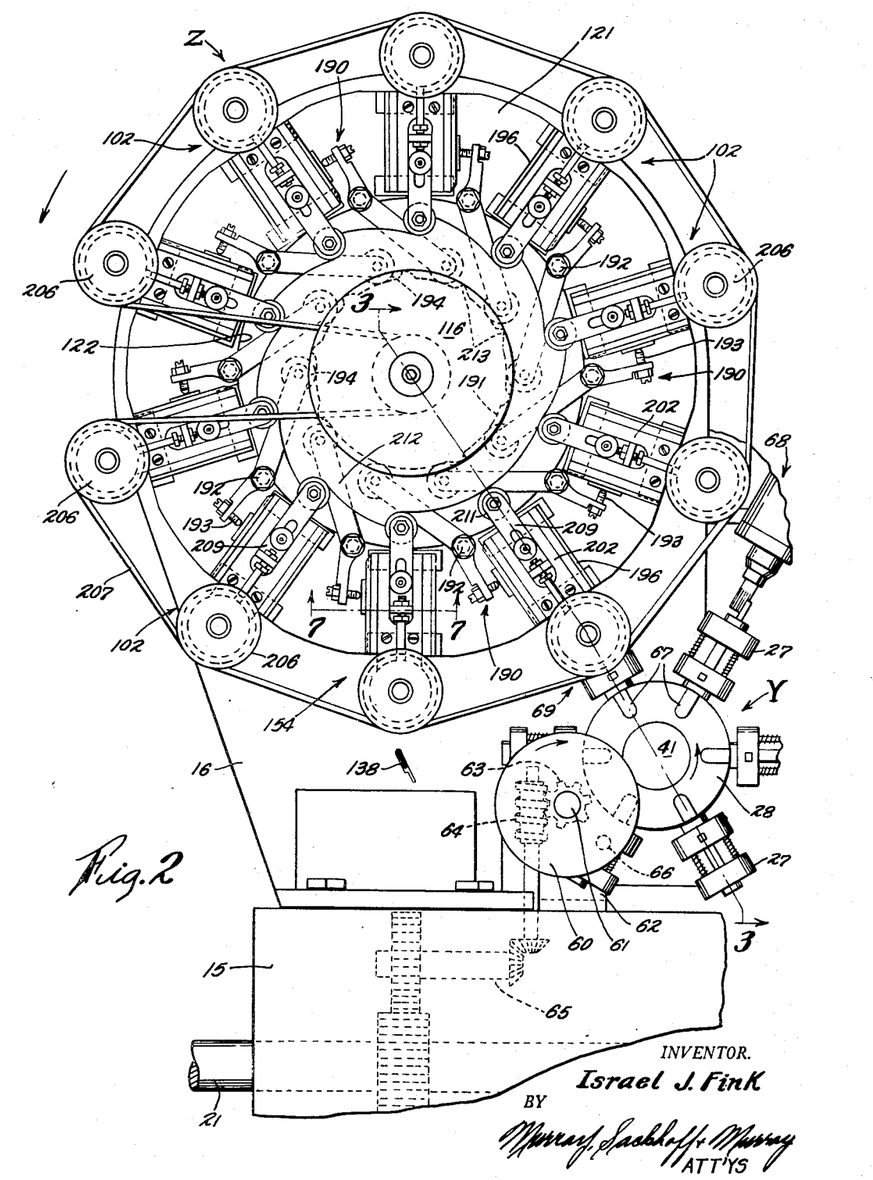
Fig. 2 is a fragmental front elevational view of my milling machine.

As most clearly illustrated in Fig. 2 the turret Y is periodically rotated one step in a counterclockwise direction by a suitable drive connection with the shaft 21 which preferably comprises a revolving disc 60 fixed on the end of a shaft 61 that is suitably journaled in a standard 62 on the machine base 15. The shaft 61 has a pinion 63 fixed thereon which meshes with a worm 64 in turn driven by drive shaft 21 through a gear train generally indicated by the reference numeral 65. The revolving disc has a roller 66 extending from its rear face which progressively engages a series of radially extending notches 67 formed in the front face of the hub 28 for the turret, said revolving disc and the turret hub co-acting in the usual manner of a Geneva star wheel to advance the turret one rotational step of 60° with each full turn of the drive disc 60.

Figures 1, 9:
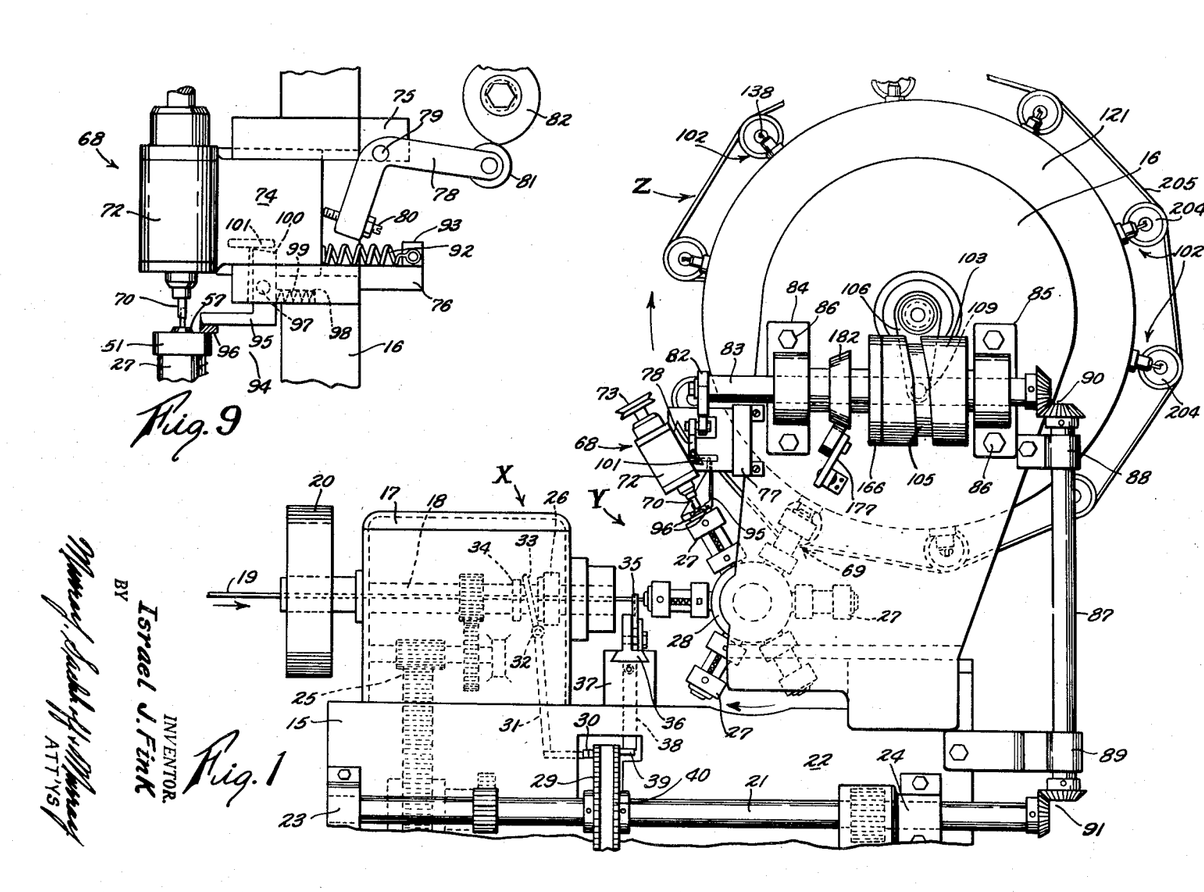
Fig. 1 is a fragmental, rear elevational view of my milling machine.
Fig. 9 is an enlarged elevational view showing in detail the cutter feed and return mechanism for the small turret illustrated in Fig. 1.

It is contemplated that different milling operations may be performed on each work piece as it is progressively advanced in its work holder 27 from one station to the other by the turret Y. As shown in Figs. 1 and 2 a single milling station 68 is provided between the work loading and cutoff station and the work transfer station 69 for the turret Y. In the event that more than one milling station be required for performing milling operations on one end of the work piece, the illustrated machine could be modified so that more than one milling station would intervene between the work leading and cutoff station 35 and the work transfer station 69 for the turret Y. A cutting tool for the station 68 is indicated by the numeral 70, and as shown in Figs. 1 and 9, this tool is disposed at the same inclination as the axis of the work holder 27 positioned at said station, with its axial center slightly offset from the axial center of the work so that said tool when fed laterally across the work will form a cut in the work such as the flat slot illustrated at 71 in Fig. 8. The tool 70 is removably mounted in a rotatable spindle 72 which is driven by a pulley 73 from a suitable source of power (not shown). The spindle is mounted in a housing integral with a keystone block 74 that is slidably mounted in opposed guide blocks 75 and 76 fixed to the frame member 16 by bracket 77. The cutter tool is fed laterally across the work by means of a bell crank follower 78 which is pivoted to the block 75 at 79 and which carries a set screw 80 at its one end which may be adjusted to vary the position of the work stroke for the cutter. The remaining arm of the bell crank follower 78 has a roller 81 which runs on a cam 82 fixed to the end of a horizontal drive shaft 83 that is mounted on the frame member 16 between journal bearing blocks 84 and 85 fixed by bolts 86 to said member. The shaft 83 is driven through a pair of bevel gears 90 by a shaft 87 mounted on the frame by journal bearing blocks 88 and 89, said shaft 87 having a drive connection with the shaft 21 through a pair of beveled gears 91. With reference to Fig. 9 the return stroke of the cutting tool 70 is effected by a spring 92 fastened at one end to the keystone block 74 and having its opposed end secured to a lug 93 extending from the block 76.

To maintain the work in a fixed position in its respective work holder during the milling operation a clamping device 94 is operated by the lateral feed movement of the cutter tool and is released by its return stroke. This device comprises a fork shaped lever 95 which has a pair of arms 96 which operatively engage the ring member 51 by straddling the work holding disc 57. The lever is pivotally mounted on a pin 97 fixed to the block 76, said block also having a bore 98 therein for receiving an expansion spring 99 which bears against the lever and normally maintains its arms 96 in an inoperative position spaced away from the work holders. The upper end of the lever has an inclined face 100 (Fig. 9) which is in the path of a cam arm 101 extending horizontally from the keystone block 74. It will therefore be noted that when the cutting tool is fed laterally toward the work by the bell crank 78 and its associated cam 82 the cam arm 101 will contact the inclined surface 100 on lever 95 thereby moving the arms 96 against the ring member 51 and as the cam arm 101 has an elongated surface, said arms will continue to bear against the ring member 51 during the milling operation on the work both during its cutter feed and cutter return strokes. With particular reference to Fig. 3 it will be noted that when the ring member 51 is depressed by the lever 95 against the action of the springs 52 the finger 55 is rocked so that a corner of its end bears with considerable force against an end of a work piece held in the disc 57 to secure the work in holder during the milling operation.

The turret Z is illustrated as having ten (10) identically constructed milling stations 102 each having an indexing work holder and an associated tool carrying member. The turret is intermittently advanced, the work holder indexed, and the tools periodically fed and returned all by means of a master barrel cam 103 (Figs. 1 and 3) keyed at 104 to the driven shaft 83 that is positioned on the rear of the frame member 16. The barrel cam has an endless groove 105 formed in its cylindrical surface which controls the swinging movement of a master control arm 106 keyed at 107 to a control rod 108, said arm carrying an antifriction roller 109 at its end for engagement in the barrel cam groove 105. As illustrated in Fig. 3 this control rod extends through a journal bearing sleeve 110 which is provided with an intermediate flange 111 for securing the sleeve to the frame member 16 by bolts 112. The shaft is mounted on two bronze bushings 113 and 114 fitted in opposite ends of the sleeve, said shaft having fixed to its intermediate portion a hub 115 for mounting two tool feed and return cams described in detail hereinafter. The outer end of the shaft has rotatably mounted thereon a power transmitting pulley 116 for driving all the tool spindles for the turret Z.

Mounted on the frame member coaxially with the shaft 108 is a work indexing ring gear 117 which in the particular embodiment of my machine has ninety (90) beveled teeth 118 formed in its peripheral portion. Bolted to the frame member 16 and arranged outside of, and concentric with the shaft 108 is a turret mounting ring 119 which has a radially extending flange 120 formed around its peripheral surface. The outer flat surface of the mounting ring and the outer surfaces of the flange slidably engage the inner annular surface of a rotatable turret head 121, which in front elevation has the form of a large disc with an enlarged concentric opening 122 therein disposed coaxially with the shaft 108. The wear surface of the turret head 121 has formed thereon an annular rib 123 which has a mounting ring 124 secured to it by bolts 125.

Figures 4, 5, 6, 7, 8:
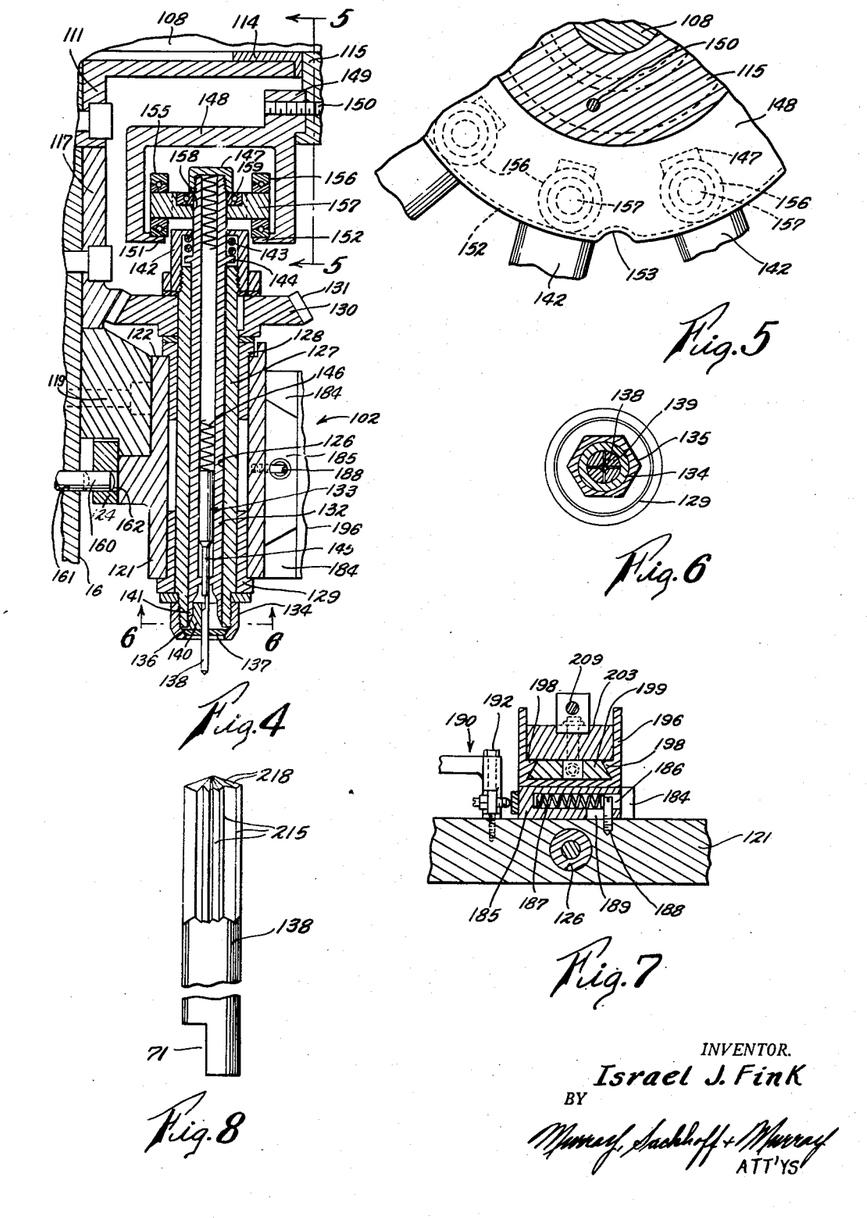
Fig. 4 is an enlarged section through one of the work holders for the large turret of my machine.
Fig. 5 is a section taken on line 5—5 of Fig. 4.
Fig. 6 is a section taken on line 6—6 of Fig. 4.
Fig. 7 is an enlarged section taken on line 7—7 of Fig. 2.
Fig. 8 is an enlarged fragmental view of a small piece such as a dental drill which may be milled on my machine.

In the head 121 at each of the milling stations 102 there is formed a radial bore 126 and as illustrated in Figs. 1, 3 and 4 these bores are ten in number and are equally spaced from each other an angular distance of 36°. These stations have identical structures and functions and only one of the stations will be hereinafter specifically described and shown in Figs. 4 and 6 of the drawings. Each of the bores is adapted to house a rotatable work holder and has journaled therein for this purpose a hollow shaft 127 mounted on a pair of bronze bushings 128 and 129 fitted in the open ends of the bore. The inner end of the shaft has keyed to it a work collet drive pinion 130 which has twenty-four (24) teeth 131 formed thereon which mesh with the teeth in the ring gear 117. Within the hollow shaft 127 there is a second work supporting tube 132 which contains the work ejecting mechanism generally indicated by the reference numeral 133.

The outer end of the shaft 127 is threaded at 134 for cooperation with a nut 135 which is provided with a tapered, internal flange 136. A tapered washer 137 having an opening formed centrally therein for receiving the work 138 is urged by the nut 135 against a split collet 139 having a number of tapered head portions 140 in engagement with a tapered outer end 141 of the tube 132. It will be understood that upon tightening of the nut 135 the washer will be urged inwardly against the collet and because of the tapered relation between its head 140 and the lower end 141 of tube 132 the collet will be compressed around and securely hold the work piece 138 against movement by a force considerably greater than axial opposition forces set up between the shaft 127 and tube 132. The shaft 127 has threaded to its inner end a cap 142 which has an opening therethrough through which the inner end of the tube 132 passes. The tube is urged outwardly in opposition to the stationary shaft 127 by a spring 143 which bears against an annular flange 144 formed on the tube and against the top of the cap 142. The spring is therefore adapted to force the outer tapered end of the tube 132 against the split work collet to thereby compress the collet heads and securely hold the work 138 therein. The work ejector 133 comprises a plunger 145 which is urged outwardly by a spring 146 housed within the tube and which bears against the plunger and against a cap 147 threaded to the upper end of the tube. The force of the spring 146 is not sufficient to overcome the clamping force of the spring 143 exerted on the work through the collet heads and therefore upon axial insertion of the work into the collet the plunger will be depressed and bear resiliently on the inner end of the work until the force on the collet heads produced by the spring 143 is released.

The mechanism for successively releasing the work collets as they pass a discharge station 154 comprises a circular track or guide 148 having the cross sectional form of a channel, and as illustrated in Figs. 3 and 4 having formed thereon an annular flange 149 which is fixed to the cam mounting hub 115 by countersunk screws 150. The track has a pair of opposed, inwardly directed flanges 151 and 152 which are positioned concentrically with the axis of the shaft 109. As illustrated in Fig. 5 the flanges have one indented portion 153 located in the same radial plane as the work discharge station 154 for turret Z (Fig. 2). A pair of rollers 155 and 156 have rolling engagement with the flanges 151 and 152 respectively, said rollers carrying between them a cross-shaft 157 provided with a centrally disposed opening 158 through which the upper end of the tube 132 projects. A cap 147 fixed on the tube has antifriction engagement with the cross-shaft 157 by means of a ball bearing 159 inset in the said cross-shaft with its inner race in engagement with the lower annular portion of the cap 147.

With reference to Figs. 4 and 5 it will be noted that when rollers 155 and 156 pass over the indented portion 153 in the track 148, said rollers will raise the tube 127 against the action of spring 143 thereby releasing the clamping pressure of the tube on the tapered collet heads 139 of the work holder. Release of the clamping pressure permits spring 146 to actuate ejector plunger 133 to discharge the completed work piece 138 from turret Z.

A means for periodically anchoring the turret head 121 to a frame member 16 to maintain it in nonrotative position whilst the tool feeds are operative comprises a turret indexing pin 160 (Figs. 3 and 4) which extends through a hole 161 formed in the frame member and which successively drops into one of a series of equally spaced holes 162 formed in the ring mounting member 124. The disposition of the individual holes in the ring member determine the successive positions of the turret Z as it is progressively rotated around the shaft 108. The outer end of the indexing pin 160 is pivotally mounted to one arm of an indexing pin pulling lever 163 which is pivoted intermediate its ends to the frame member on a bracket 164, the opposed arm thereof carrying a follower roller 165 which bears against a cam 166 fixed to the drive shaft 83. The lever is urged by a spring 167 into roller contact with the cam which in turn constantly urges the pin toward turret locking position illustrated in Fig. 3.

With reference to Figs. 1 and 2 it will be noted that the turrets Y and Z come to rest with a work holder on one turret disposed in axial alignment with a work holder on the other turret. Whilst the turrets are in said positions there is provided a periodically actuated means for transferring the work milled on one end from the holder in turret Y to the aligned work holder for turret Z whereby to perform a series of milling operations on the opposed unfinished end of the work. To this end a transfer member 168 (Fig. 3) is mounted for sliding movement in a slot 169 formed in a block 170 mounted on the frame member 16. The transfer member is spring urged outwardly by a spring 171 which encircles a guide rod 172 that is anchored by a lug 173 on the block and which extends through a guide hole 174 in the member. As illustrated in Fig. 3 each of the ring members 50 for the work holders 27 have a slot 175 therein for progressive engagement with an arm 176 formed at right angles on the transfer member 168. A transfer lever 177 is pivotally supported on a pin 178 carried by a frame mounted bracket 179, said lever having its lower arm engaged in a hole 180 formed in the member and having a roller 181 on its opposed end which is in engagement with the periphery of a cam 182 fixed to the operating shaft 83. With each revolution of the shaft 83 the roller 181 engages, and is moved downwardly by a narrow lobe 183 formed on the cam 182 which serves to rock the lever 177 on its axis 178 to shift the transfer member 168 upwardly thus moving the ring member 50 upwardly to bring the ejector rod 58 against the inner end of the work held in the collet head 57 whereby the work is moved axially from the holder in turret Y and projected, milled end first, into the collet 140 for further milling operations on the unmilled end of the work by turret Z.

A tool carriage is mounted at each station 102 to permit movements of the tool transversely of its axis and/or laterally thereof, the transverse guide for the tool comprising a pair of spaced, guide bars 184 bolted to the turret head and slidably positioning between them a keystone block 185 for tangential shifting movement on the turret head. The block (Fig. 7) has a transverse bore 186 therein for enclosing a spring 187 that bears against a set screw 188 threaded in the head and extending through an elongated slot 189 formed in the block. This spring constantly urges the keystone block toward a tool inoperative position and functions to set up a rotational force in a cam follower 190 urging it against a tool feeding cam 191, said cam follower being pivoted at 192 in the head and having an adjustable sliding connection 193 with the block. The opposed end of the follower carries a roller 194 in running engagement with the periphery of the cam 191, fixed to the turret hub 115 by screws 195.

The longitudinal guide for the tool carriage at each of the turret milling stations is carried by the laterally movable keystone block 185, said guide comprising a U-shaped guide member 196 disposed radially with respect to the turret and fixed to the outer surface of the block 185 by bolts 197, said guide having opposed tapered ways 198 formed in its sidewalls for receiving a slide block 199. This slide block is movable in the ways and is constantly urged inwardly toward the hub of the turret by a spring 200 bearing against a dog 201 fixed to the member 196 and engaging at its upper end against a cap 202 comprising a part of said slide block.

As illustrated in Fig. 3 a block 203 has mounted thereon a tool spindle 204 which has a tool holder 205 at one end and a spindle drive pulley 206 fixed at its outer end; the pulleys 206 for all the milling stations 102 being driven by a loose, endless belt 207 which engages all the said pulleys and passes around a groove 208 formed in the drive pulley 116. The spindle and the tool are fed laterally with respect to their axes and outwardly in a radial direction with respect to the turret Z by an arm 209 adjustably mounted on the block 203 by a set screw 210, said arm carrying a roller 211 that constantly bears against a second tool feeding cam 212 fixed by the bolts 195 to the hub 115 and thereby rocked continuously by the shaft 108 in unison with tool cam 191.

Figures 10, 11:
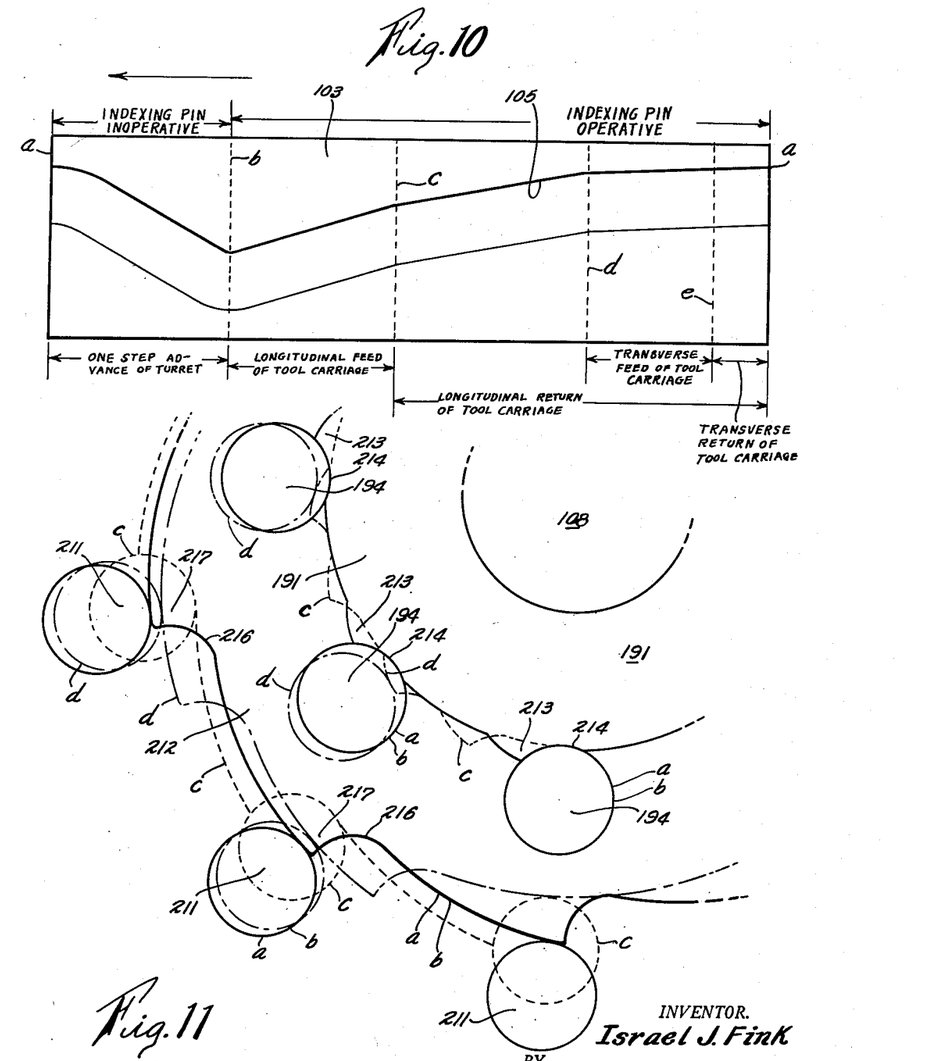
Fig. 10 is a development of the master indexing cam for my machine.
Fig. 11 is a diagrammatic view of the tool actuating cams and their respective cam followers in various tool feed and return positions.

With particular reference to Figs. 2 and 11 it will be noted that the first mentioned tool feeding cam 191 has a number of equally spaced lobes 213 around its periphery, said lobes having relatively short tangential dimensions. Adjacent said lobes are trough portions 214 somewhat inset with respect to the major portion of the cam periphery. As has been stated the keystone blocks 185 for the milling stations are all spring urged toward tool inoperative position and they set up a rotative force in their respective follower arms 190 to urge the follower rollers 194 against the periphery of cam 191. When the cam 191 and rollers 194 are in the position as shown in Fig. 10 the rollers are positioned in the trough portions 214 which form a separable drive connection between the turret head and the control arm 106 when the cam indexing pin 160 is withdrawn from turret locked position.

With reference to Fig. 10 the reference letter a represents the portion of the groove 105 of the master cam 103 wherein the roller 109 of the control arm 106 is stationed at the beginning of a milling cycle for turret Z. It will be noted that the rollers 194 are disposed in the trough portions 214 in the cam 191 to provide a drive connection between the control arm and the turret head. At this point the cam 166 has lifted the indexing pin 160 out of the hole 162 permitting a one step rotational movement of the head and its milling stations 102. The control arm 106 thus begins a phase of its oscillation through approximately a 36° shift, said shift being represented by the inclined portion on the right of the groove 105 between the positions a and b in Fig. 10. The shift of the control arm functions to rotate the turret head and its stations through 36° because of the drive connection comprising said arm 106, hub 115, tool cam 191, the spring urged cam followers 190 disposed in troughs 214 in said cam and the cam follower pivot connections 192 with the turret head. Upon completion of the station advancing turn of the turret the indexing pin 160 drops into the next succeeding hole 162 to lock said turret head to the frame.

During the advancing movement of the turret head the work pieces in each of the work holders are indexed by rotation around their longitudinal axes. As has been stated the work collet drive pinion 130 at each milling station meshes with the indexing ring gear 117 and said gear has ninety (90) teeth therein whilst each pinion has twenty-four (24) teeth. Rotation of the turret head through 36° therefore rotates the pinions and their associated work collets through 135° to simultaneously present a different portion of each work piece to its tool for a milling operation. With particular reference to Fig. 2 it will thus be noted that as the turret advances the work collets and their tools through eight (8) milling stations (exclusive of the work transfer station 69 and the discharge station 154) by seven (7) intervening advancing movements, a series of longitudinal cuts 215, angularly positioned 45° apart, are formed in the work 138.

At position b on the master cam 103 illustrated in Fig. 10 the indexing pin 160 falls into a hole in the turret to lock the turret to the frame and it will be noted that the tool cams 191 and 212 and their associated rollers have the same positions for points a and b in Fig. 11 indicative of the fact that there was no relative movement between them during the turret advance. Upon locking of the turret the master cam starts the control arm on the second, longest, and opposed phase of its oscillation wherein the said tool cams are moved relative to the anchored turret head. This phase of the control arm movement sets up a counterclockwise rotation of the cams as illustrated in Fig. 11 whereby it will be seen that rollers 211 initially fall into troughs 216 on the cam 212 thus effecting rapid feed movements of all the tools longitudinally of their respective work pieces under the impetus of the springs 200. The final feed positions of the rollers and cam surfaces are indicated by dotted lines c in Fig. 11 and by the letter c in Fig. 10. After rapid longitudinal feed of the tools, relatively slow, longitudinal return strokes are made by the tools between positions c and a in Fig. 10 which are controlled by the long sides which form lobes 217 on the cam 212.

At position d the lobes 213 on cam 191 engage and move their respective rollers 194 outwardly which in turn actuates the lateral feed and return strokes for the tools. As indicated in Fig. 10 lateral feed of the tools is effected during the final portions of the longitudinal tool return strokes (from d to e in Fig. 10) so that the concurrent actuation of the tool carriages by two cams sets up compound tool movements which mill inclined lateral cuts 218 in the ends of the work pieces 138. This concurrent actuation of the two tool cams is made between the points d and e on the master cam illustrated in Fig. 10, and the corresponding positions of the cams 191 and 212 with the respective rollers 194 and 211 shown in dash and dot lines d in Fig. 11. Between points e and a both tools are returned to inoperative positions in which rollers 194 are again moved into their trough portions to drive the turrets, and the rollers 211 are held in their outermost positions by the lobes 217. At position a the indexing pin 160 is again withdrawn by its cam and the turret is in condition to carry through another cycle in its progressive operation on work pieces.

As has been pointed out heretofore one master cam revolution is required for tool feed and return movements. At any interval during the time the turret is locked to the frame for these milling operations the work transfer mechanism 69 may be actuated by engagement of the transfer lever 177 with the lobe 183 on the cam 182 so that the work finished on its one end by turret Y is transferred from the holders 27 to the work collets in turret Z. During the greater part of the machine operation the turret Y is inoperative at which time milling may be carried out at anyone of the other stations beside the work loading and work unloading stations by suitable cutters or millers such as that illustrated by the reference numeral 68. At the time of work transfer from turret Y to turret Z the work feed and cutoff device X may be operated by the indexing cams 29 and 39 to feed the bar stock into the work holder 27 then at rest in axial alignment with the stock, and upon insertion of the end of the stock therein a desired length of stock may be cut from the end of the bar by actuation of the cutoff device.

It is contemplated that the tool carriage feeding cams 191 and 212 may have other desirable contours so that a great variety of straight or compound tool feed motions may be effected at each station of the machine. Said motions may either be identical to the tool movements simultaneously effected at the other stations or may be different therefrom, all dependent upon the milling requirements for the particular article to be formed on my machine.

While the foregoing specification sets forth the invention in specific terms, it is to be understood that numerous changes may be made therein without departing from the spirit and scope of the invention as claimed hereinafter; for example the tool spindles 204 could be designed to carry drilling and tapping devices instead of the milling devices shown in the drawing, or one or more of the tool carriages in the turret stations 102 could be mounted for work forming movements on the frame 16 instead of upon the turret itself in a manner similar to the construction of the single milling station 69, detailed in Figs. 1 and 9, wherein the tool carriage 74 is mounted for sliding movement on the frame 16 for operation upon work chucked in turret Y. Other modifications will readily occur to those skilled in the art within the terms of the appended claims.

What is claimed is:

1. A milling device having a frame, at least two turrets mounted on the frame for synchronized, intermittent rotary movements, a circular row of equispaced work holders mounted in fixed radially disposed positions on each of the turrets, a work receiving opening formed radially in each holder, resilient work clamping elements associated with each opening and normally biased to work clamping conditions, positive stop means associated with each turret and adapted to progressively position adjacent tool holders of the turrets in work transferring position with their respective work receiving openings in axial alignment, a work transfer member mounted for reciprocating movement on the frame between the adjacently positioned work holders, and means for periodically actuating the work transfer means during concurring dwell periods of the turrets.

2. A milling device having a frame, at least two turrets mounted on the frame for synchronized, intermittent rotary movements, a circular row of equispaced work holders mounted in fixed radially disposed positions on each of the turrets, a work receiving opening formed radially in the outer end of each holder, resilient work clamping elements associated with each opening and normally biased to work clamping conditions, a normally retracted work transfer means for each work holder disposed in axial alignment with the inner end of the work held in each holder, positive stop means associated with each turret and adapted to position adjacent work holders of the turret in work transferring positions with their respective work receiving openings in axial alignment, a work transfer member mounted on the frame for reciprocating movement between the adjacent work holders, means on the transfer member for engaging the work transfer means, and means for periodically actuating the work transfer member during concurring dwell periods of the turrets.

3. A milling device having a frame, two turrets mounted on the frame, a circular row of equispaced work holders mounted in fixed, radially disposed positions on each of the turrets, milling tools associated with each work holder, a collet opening formed radially in the outer end of each holder for receiving a cylindrical work piece, a resilient work clamping element associated with each opening, means for normally biasing the element into work clamping position, a normally retracted work transfer plunger mounted for sliding movement coaxially with its respective collet opening, intermittently operable power means for rotating the turrets in synchronism, stop means operable during turret dwells to position adjacent work holders of the turrets in axial alignment, a work transfer member mounted on the frame for reciprocating movement between the adjacent work holders, means on the work transfer member for engaging the transfer plunger of one of the adjacent work holders, and power means for periodically actuating the milling tools and the work transfer member.

4. In a milling machine a turret, a plurality of rotary work holders mounted in fixed radial positions on the turret, means for intermittently rotating the turret, means operable by rotation of the turret for indexing the work holders in unison, a tool spindle mounted on the turret adjacent each work holder and movable thereon with respect to the said holder to effect a predetermined milling operation on the work piece held in the said holder, and means operable during turret dwell periods for feeding and returning the tool spindles relative to the said work pieces.

5. In a milling machine a base, a turret mounted on the base, an oscillating power means mounted on the base, a plurality of rotary work holders mounted in fixed radial positions on the turret, an indexing drive element on the base, a cooperating drive element fixed to each work holder, a tool carriage slidably mounted on the turret adjacent each holder, a tool spindle positioned on each carriage and movable therewith to effect feed and return movements relative to work pieces in the respective holders, an intermittently actuated clutch drive between the power means and the tool carriages, means for operating the clutch during one phase of movement of the power means to rotate the turret, and means operable during the opposite phase of movement of the power means to effect feed and return strokes for the tool spindles.

6. In a milling machine a base, a turret mounted on the base, an oscillating power means mounted on the base, a plurality of equispaced work holders mounted on the turret for rotary movement in fixed radial positions on the said turret, a work indexing ring gear mounted on the base coaxially with the turret, a drive pinion fixed on each work holder and in meshing relationship with the ring gear, a tool spindle movably mounted on the turret adjacent each work holder and movable thereon with respect to the work in said holder, an intermittently actuated clutch between the power means and the tool spindle, means for operating the clutch during one phase of movement of the power means for rotating the turret, and means operable during the opposite phase of movement of the power means to effect feed and return strokes for the tool spindles.

7. In a milling machine a base, a turret mounted on the base, an oscillating power means mounted on the base, a plurality of rotary work holders mounted in fixed radial positions on the turret, means operable during rotation of the turret for indexing the work holders in unison, a tool carriage mounted on the turret adjacent each holder for independent radial and tangential movements with respect to the said turret, a tool spindle positioned on each carriage and movable therewith to effect feed and return movements of the tool relative to the work pieces in lateral and axial directions respectively with respect to the said movements of the tool carriage, a pair of cams driven by the power means and each having a drive connection with all of the tool carriages, clutch means interposed between one of the cams and its drive connection with the tool carriages, means for operating the clutch during one phase of movement of the power means for rotating the turret, and means operable during the opposite phase of movement of the power means for moving the carriages.

8. In a milling machine a base, a turret mounted on the base for intermittent rotary movement, an oscillating control shaft journaled on the base, a plurality of rotary work holders mounted in fixed radial positions on the turret, means operable during rotation of the turret for indexing the work holders in unison, a tool carriage mounted on the turret adjacent each holder for compound motion, a tool spindle positioned on each carriage and movable therewith to effect milling operations on a work piece held in its respective tool holder, at least two cams fixed on the control shaft, a direct drive connection between one cam and the carriage to effect a feed and return stroke comprising one component of the tool carriage motion, and a reverse motion drive connection between the remaining cam and the carriage to effect a different feed and return stroke comprising another component of the tool carriage motion, and periodically operable stop means mounted on the base and engageable in the turret to lock the turret to said base to effect the compound motion of the tool carriages.

9. In a milling machine a base, a turret mounted on the base for intermittent rotary movement, an oscillating control shaft journaled on the base coaxially with the turret, a plurality of work holders mounted in fixed angular positions on the turret with their respective axes lying in radii of the turret, means operable during rotation of the turret for indexing the work holders in unison, a keystone block mounted on the turret for rectilinear sliding movement, a tool carriage mounted on the block for rectilinear sliding movement in a cross-direction with respect to the direction of movement of the said block, a tool spindle positioned on the tool carriage and movable therewith to effect milling operations on a work piece held in an adjacent tool holder, at least two cams fixed on the control shaft, independent motion transmitting means between a cam and the keystone block, a second motion transmitting means between the carriage and the remaining cam, and periodically operated stop means mounted on the base for locking the turret to the base for effecting relative rotary movement between the cams and the turret.

10. In a milling machine a base, a turret mounted on the base, a control shaft mounted on the base coaxially with the turret, power means for oscillating the shaft around its axis as a center of rotary movement, a plurality of rotary work holders mounted in fixed radial positions on the turret, an indexing drive element on the base, a cooperating drive element fixed to each work holder, a first tool carriage part slidably mounted on the turret adjacent each work holder and movable thereon in a tangential direction with respect to the said turret, a second tool carriage part mounted on each of the first mentioned tool carriage parts for sliding movement in a direction normal to the movement of the said first mentioned carriage, a tool spindle positioned on each second carriage part and movable therewith to effect feed and return movements relative to the work pieces in the respective holders, a pair of cams mounted on the control shaft for oscillating movements in planes normal to the axis of said shaft, a drive connection between each of the first carriage parts and one cam, drive connections between the remaining cam and all of the second carriage parts, a clutch interposed between the first carriage part and the cam, means for actuating the clutch during one phase of movement of the power means for rotating the turret, and means operable during the opposite phase of movement of the control shaft for effecting coordinate feed and return strokes for the first and second tool carriage parts.

11. In a milling machine a base, a turret mounted on the base for intermittent rotary movement, an oscillating control shaft journaled on the base coaxially with the turret, a plurality of work holders mounted in fixed, angular positions on the turret with their respective axes lying in equispaced radii of the turret, means associated with the base and each work holder for indexing said holders in unison, a keystone block mounted on the turret for rectilinear sliding movement, a tool carriage mounted on the block for rectilinear sliding movement in a direction normal to the direction of movement of said block, a tool spindle positioned on the tool carriage and movable therewith to effect milling operations on a work piece held in an adjacent tool holder, at least two cams fixed on the tool shaft, a set of followers for one cam mounted on the turret and adapted to actuate the keystone blocks, a second set of followers associated with the remaining cam and adapted to actuate the tool carriages, and periodically operated stop means mounted on the base for locking the turret thereto to effect relative rotary movement between the cams and the turret.

12. In a milling machine a base, a turret mounted on the base for intermittent rotary movement, an oscillating control shaft journaled on the base coaxially with the turret, a plurality of work holders mounted in fixed, angular positions on the turret with their respective axes lying in equispaced radii of the turret, means associated with the base and each work holder for indexing said holders in unison, a keystone block mounted on the turret for rectilinear sliding movement, a tool carriage mounted on the block for rectilinear sliding movement in a direction normal to the direction of said block, a tool spindle positioned on the tool carriage and movable therewith to effect milling operations on a work piece held in an adjacent tool holder, at least two cams each having a series of alternate lobes and trough portions formed in their respective peripheries, a set of followers for one cam pivotally mounted intermediate their ends to the turret and having their outer arms associated with the keystone blocks, a set of followers mounted on the tool carriages and extending into engagement with the remaining cam, stop means mounted on the base for locking the turret thereto for effecting relative rotary movement between the cams and said turret, and periodically operated release means for the stop to effect rotation of the turret when at least one set of followers are in the troughs of its respective cam to provide a drive means for rotating the turret.

13. In a milling machine the combination of a base, an oscillating control shaft mounted on the base, a turret rotatably mounted on the shaft, a plurality of rotary work holders mounted in fixed radial positions on the turret, means made operable by rotation of the turret for indexing the work holders in unison, a tool carriage mounted on the turret adjacent each holder for compound movement to effect milling operations on a work piece in said holder, cam means fixed on said shaft, lock means for the turret, means for periodically rendering the lock means inoperative, means for rendering operative a drive connection between the cam means and turret when the lock means is inoperative, and operating means between the cam means and the carriage rendered operative by the operative position of the said lock means.

14. In a milling machine the combination of a base, an oscillating control shaft mounted on the base, a turret rotatably mounted on the shaft, a plurality of rotary work holders mounted in fixed radial positions on the turret, means made operable by rotation of the turret for indexing the work holders in unison, a tool carriage mounted on the turret adjacent each holder for compound movement to effect milling operations on a work piece in said holder, lock means normally operative between the turret and the base, cam means fixed on the shaft and normally operable during one phase of movement of the cam means to move all of the tool carriages, and means for periodically releasing the turret to provide intermittent rotary movement for the turret during the opposite phase of movement of the cam means.

15. In a milling machine the combination of a base, an oscillating control shaft mounted on the base, a turret rotatably mounted on the shaft, a plurality of rotary work holders mounted in fixed radial positions on the turret, means made operable by rotation of the turret for indexing the work holders in unison, a tool carriage mounted on the turret adjacent each holder for compound movement to effect milling operations on a work piece in said holder, periodically operable lock means between the turret and the base, cam means fixed on the shaft, drive means for operably connecting the cam means to all of the carriages for moving them in unison when the lock means is operative, and means for periodically releasing the turret to render the drive means effective to rotate the turret.

16. In a milling machine the combination of a base, an oscillating control shaft mounted on the base, a turret rotatably mounted on the shaft, a plurality of rotary work holders mounted in fixed radial positions on the turret, means made operable by rotation of the turret for indexing the work holders in unison, a tool carriage movably mounted on the turret adjacent each holder for effecting milling operations on a work piece in said holder, cam means fixed to the shaft for moving all the tools in the carriages transversely of their axes, cam means fixed to the shaft for moving all the tools in the carriages axially on their axes, lock means operable to periodically anchor the turret to the base to render the cam means operable, and means for releasing the turret to provide intermittent rotary movement for the turret through the cam means.

17. A milling device having a periodically rotated turret, a circular row of milling stations positioned on the turret, a radially extending work holder for each station, an independent work holder positioned adjacent the periphery of the turret and in axial work transferring alignment with the work holder of each successive milling station when the turret is at rest, means for replenishing the independent work holder, a continuously operable work clamp for each of said work holders, a work transfer means operable longitudinally between the independent work holder and a work holder on the turret for axially forcing the work piece from the clamp in the independent work holder and forcefully pushing it into the clamp in the aligned work holder in the turret, and means operable during the turret dwell periods for actuating the work transfer means.

18. A milling device having a frame, at least two turrets mounted on the frame for synchronized, intermittent rotary movements, a circular row of work holders mounted in fixed positions on each of the turrets, a radially extending continuously actuated work receiving opening formed in each holder, a work clamping element associated with each opening, positive stop means associated with each turret and adapted to progressively position adjacent tool holders of the turrets in work transferring position with their respective work receiving openings in axial alignment, a work transfer member mounted for reciprocating movement on the frame between the adjacently positioned work holders and adapted to axially force the work piece from one of the aligned work holders and forcefully push it into the aligned work holder in the remaining turret, and means for periodically actuating the work transfer means during concurring dwell periods of the turrets.

19. A milling device having at least two turrets mounted adjacent each other, a circular row of radially extending work holders mounted in fixed angular relationships on each of the turrets, power means for intermittently turning the turrets in synchronism, a positive stop means associated with each turret and adapted to progressively position successive tool holders on the turrets in axial alignment during turret rest periods, and a reciprocating work transfer means operable longitudinally of the aligned tool holders during each turret dwell period to move a work piece axially from one axially positioned tool holder into the other said tool holders.

20. A milling device having a periodically rotated turret, a plurality of milling stations positioned on the turret, a radially extending work holder for each station, a fixed work holder positioned adjacent the periphery of the turret and in axial work transferring alignment with the work holder of a milling station when the turret is at rest, means for replenishing the independent work holder, a work transfer means movable between the fixed work holder and a work holder on the turret, and means operable during turret dwell periods for actuating the work transfer means.

21. In a milling machine a turret, a plurality of rotary work holders mounted in fixed radial positions on the turret, means for intermittently rotating the turret, means operable by rotation of the turret for indexing the work holders in unison, a tool spindle operatively mounted adjacent each work holder and movable with respect to the said holder to effect a predetermined milling operation on the work piece held in the said holder, and means operable during turret dwell periods for feeding and returning the tool spindles relative to the said work pieces.

22. In a machine tool a base, a turret mounted on the base, an oscillating power means mounted on the base, a plurality of rotary work holders mounted in fixed radial positions on the turret, an indexing drive element on the base, a cooperating drive element fixed to each work holder, a tool carriage slidably mounted adjacent each holder, a tool spindle positioned on each carriage and movable therewith to effect feed and return movements relative to work pieces in the respective holders, an intermittently actuated clutch drive between the power means and the tool carriages, means for operating the clutch during one phase of movement of the power means to rotate the turret, and means operable during the opposite phase of movement of the power means to effect feed and return strokes for the tool spindles.

23. In a machine tool a base, a turret mounted on the base, an oscillating power means mounted on the base, a plurality of equispaced work holders mounted on the turret for rotary movement in fixed radial positions on the said turret, a work indexing ring gear mounted on the base coaxially with the turret, a drive pinion fixed on each work holder and in meshing relationship with the ring gear, a tool spindle movably mounted adjacent each work holder, an intermittently actuated clutch between the power means and the tool spindle, means for operating the clutch during one phase of movement of the power means for rotating the turret, and means operable during the opposite phase of movement of the power means to effect feed and return strokes for the tool spindles.

24. In a machine tool a turret, a plurality of rotary work holders mounted in fixed radial positions on the turret, means for intermittently rotating the turret, means operable by rotation of the turret for rotatably indexing the work holders in unison, a tool operatively mounted adjacent each work holder and movable with respect to the said holder to effect a predetermined forming operation on the work piece held in the said holder, and means operable during turret dwell periods for feeding and returning the tools relative to the said work pieces.

References Cited in the file of this patent

UNITED STATES PATENTS

| | | |
|---|---|---|
| 2,005,375 | Jones et al. | June 18, 1935 |
| 2,080,157 | Yager et al. | May 11, 1937 |
| 2,237,359 | Ott | Apr. 8, 1941 |
| 2,251,948 | Oberhoffken et al. | Aug. 12, 1941 |
| 2,433,076 | Weckstein | Dec. 23, 1947 |